United States Patent [19]
Osterfeld et al.

[11] Patent Number: 5,290,120
[45] Date of Patent: Mar. 1, 1994

[54] SELF-LOCKING BALL-AND-SOCKET MECHANISM

[75] Inventors: Douglas L. Osterfeld; Craig A. Osterday; Omer C. Denney; James D. Keaton, all of Dayton; David E. Staeuble, Kettering; Larry C. A. Studebaker, Englewood; William L. Van Doren, Dayton, all of Ohio

[73] Assignee: General Motors Corporation, Detroit, Mich.

[21] Appl. No.: 969,732

[22] Filed: Oct. 29, 1999

Related U.S. Application Data

[63] Continuation-in-part of Ser. No. 712,029, Jul. 7, 1991, Pat. No. 5,163,773.

[51] Int. Cl.5 .............................................. F16C 11/08
[52] U.S. Cl. .................................... 403/133; 403/140; 403/135; 92/187
[58] Field of Search .................. 403/133, 135, 140, 122, 403/76, 132; 384/203, 206–209; 303/113.1, 113.2, 113.3; 92/187, 188

[56] References Cited

U.S. PATENT DOCUMENTS

| 3,787,127 | 1/1974 | Cutler | 403/133 |
| 4,194,850 | 3/1980 | Cranmore | 403/140 |
| 4,318,627 | 3/1982 | Morin | 403/133 |
| 4,650,363 | 3/1987 | Kehl et al. | 403/140 |
| 4,904,106 | 2/1990 | Love | 403/135 X |
| 5,011,321 | 4/1991 | Kidokoro | 403/122 X |
| 5,163,773 | 11/1992 | Denney et al. | 403/133 |

Primary Examiner—Randolph A. Reese
Assistant Examiner—Harry C. Kim
Attorney, Agent, or Firm—Ernest E. Helms

[57] ABSTRACT

A push rod is connected in pivotal retained relation to a polymeric member such as a power booster air valve polymeric insert having a stiffness less than that of an air valve. In a preferred embodiment, the insert is fitted on the spherical ball end of the push rod, and the insert with the push rod is then inserted into a recess in the member. The insert has a plurality of arms extending from the insert base end at a slight angle outwardly relative to the insert axis. The insert also has an attached metallic end on its base end to better distribute the force input from the push rod to the air valve. The arms and the member recess are provided with various cam surfaces which force the arms inwardly in cantilever fashion during the insertion movement, and the arms have surfaces on their outer ends which fit within an annular groove in the cylindrical side wall of the member recess, locking the insert to the rod spherical ball end and also within the member recess.

6 Claims, 1 Drawing Sheet

SELF-LOCKING BALL-AND-SOCKET MECHANISM

FIELD OF THE INVENTION

This invention is a continuation-in-part of U.S. application Ser. No. 07/712,029 Denney et. al., filed Jul. 7, 1991 (hereinafter referred to as "Denney"), U.S. Pat. No. 5,163,773, and is an improvement to the invention disclosed therein. The disclosure of Denney is hereby incorporated by reference herein.

The invention of Denney relates to mechanisms which have a ball-and-socket relationship of parts and more particularly to such mechanism in which the ball end of a push rod or the like is inserted into a member and is secured in place at the completion of the insertion without requiring any staking or other completion of the assembly by installation of retainers such as pins or clips. The Denney invention is particularly applicable to brake and clutch mechanisms such as master cylinders and power boosters.

DISCLOSURE STATEMENT master cylinders and power boosters such as those commonly used in brake and clutch systems are usually actuated by means of a push rod connected to be actuated in the apply direction by a pedal. The push rod, having one end connected to a pedal arm which swings in an arc about a pedal pivot, has that end moving pivotally in a plane as well as axially as the pedal is pressed. The other end usually has a ball end on it and is attached to a master cylinder piston or a power booster control valve which moves axially in a cylinder. Thus, that rod other end is restricted to linear movement along the axis of that cylinder. For this reason, that rod other end is commonly made with a ball end which fits in a socket in the master cylinder piston or the power booster control valve, the arrangement being such that the necessary pivotal movement of the rod is accommodated.

The invention of Denney includes an insert having a plurality of angularly extending resilient cantilever spring arms in its free position, the insert being installed over the ball end of the push rod and then being inserted into a recess in one end of a piston or valve or other member to be actuated by the push rod. The insert arms are partially collapsed by camming action as it is pushed into the recess until the arms enter the recess. Flange segments on the free ends of the arms then snap outwardly by spring action of the arms when they enter a groove in the recess. The end walls of the flange segments engage a shoulder and a mating cam-like surface forming the side walls of the groove, blocking removal of the push rod ball end and retaining the push rod in position. The interior of the insert has a part-spherical surface engaging the ball end in compression force transmittal relation, and the arms have segmental part-spherical surfaces which also engage the ball end. They receive, in compression, any tension forces tending to move the push rod out of the recess.

When the mechanism of Denney is used in a pneumatic vacuum brake booster, the push rod is almost always metallic due to the forces that are exerted on it by the brake pedal. The valve member (commonly) referred to as an air valve typically is fabricated from a metal material. It is desirable from an environmentally-mandated goal of weight savings and from a machining cost standpoint to convert the air valve to a polymeric material. If the air valve is a polymeric material, it still must be stiffer than the insert. However, the insert and air valve must accommodate if, loading of approximately 3200 lbf. The loading factor is even more critical when the air valve has a reduced diameter on an end of the air valve opposite the push rod.

SUMMARY OF THE INVENTION

The present invention provides an improvement to the self-locking ball-and-socket mechanism of Denney, providing a force distribution member between the insert and (air) valve member. The force distribution member allows the (air) valve to be fabricated from an injection-moldable polymeric material which is more stiff than the insert, yet is able to stand very high force inputs.

DETAILED DESCRIPTION

Figure 1:
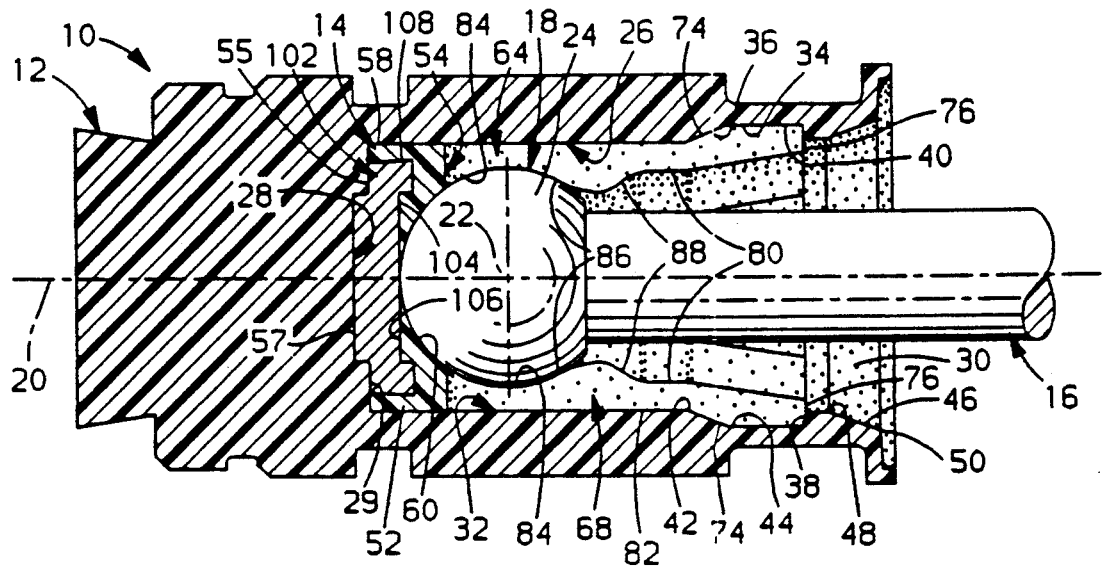
FIG. 1 is a fragmentary cross section view of a power booster air valve assembly, illustrating the preferred embodiment of relevant portions of the self-locking ball-and-socket mechanism embodying the invention.
Figure 2:
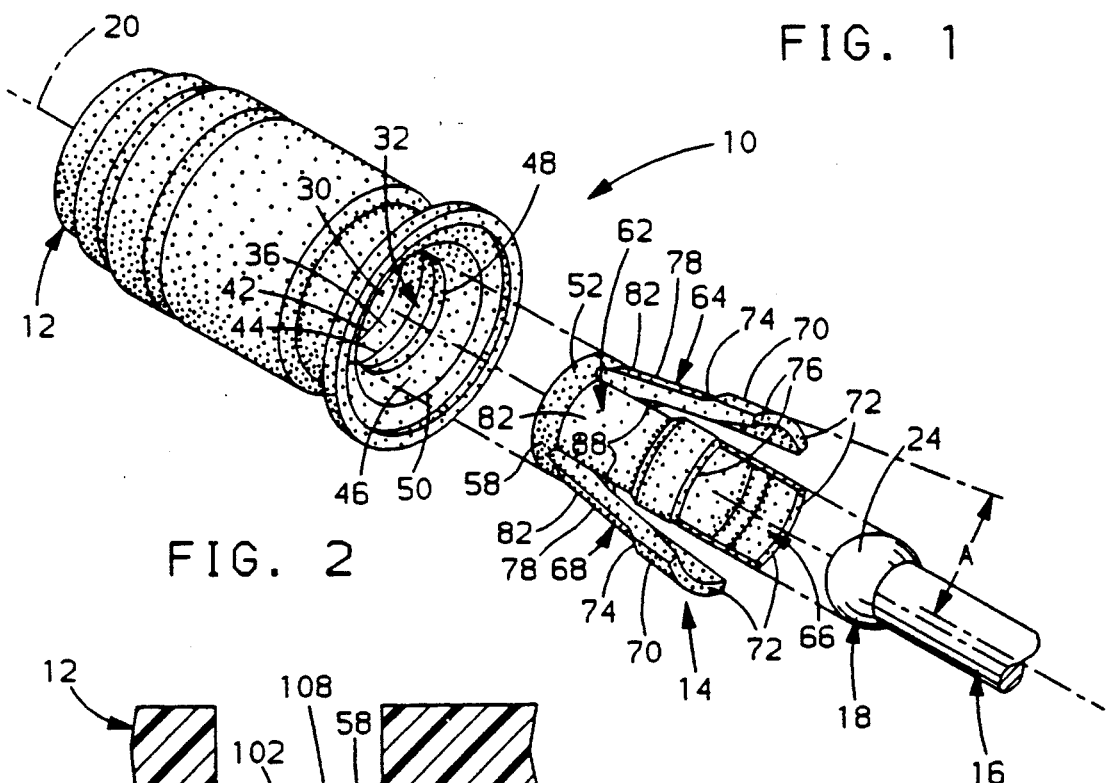
FIG. 2 is an exploded perspective view of the mechanism of FIG. 1 showing the relationship of the various elements of the invention before assembly is begun.
Figure 3:
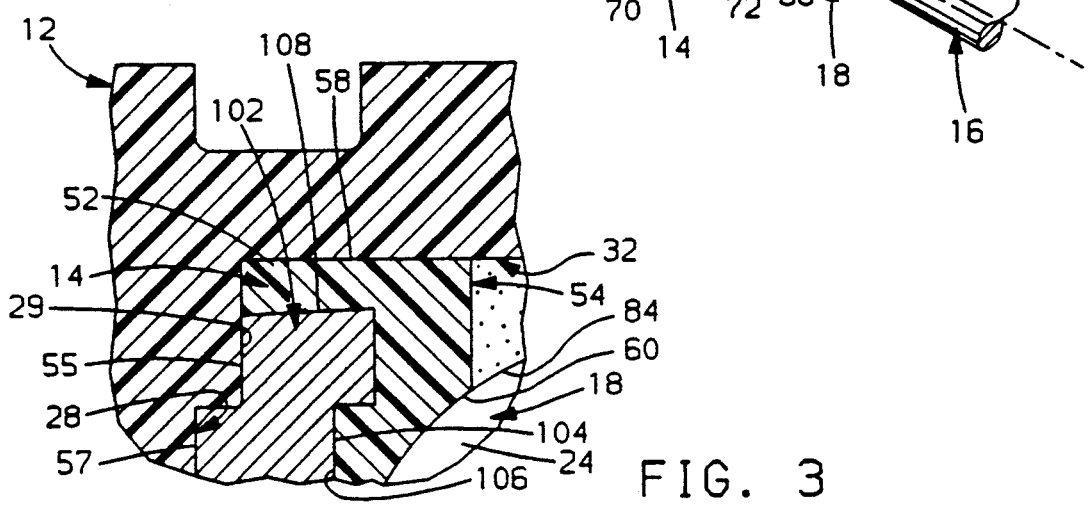
FIG. 3 is an enlarged view of a portion of FIG. 1.

The self-locking ball-and-socket mechanism 10 of FIG. 1 includes an axially extending, polymeric rigid plastic member 12 illustrated in this preferred embodiment as the air valve of a vacuum-suspended power booster. The member 12 can be one of any number of high strength plastics. A particularly suitable material has been found to be polyphenylene sulfide with 65 percent mineral/fiberglass having an ASTM D-790 flexture modulus of $2.4 \times 10$ psi. By being a polymer, member 12 saves the booster weight and allows the member 12 to be injection molded instead of being machined. It is to be understood that mechanism 10 may have other functions and uses, and the member 12 is not limited to such a valve or to a master cylinder piston. It may readily be adapted to other arrangements which require a ball-and-socket arrangement without departing from the invention.

Mechanism 10 further includes a polymeric plastic insert 14 and a metallic push rod 16. The insert is manufactured from a polymeric plastic which is less rigid than the material of the air valve so that it can be snapped into member 12 in a manner later to be explained. The push rod has a spherical ball end 18 which is larger in diameter than the diameter of the part of the push rod adjacent the ball end 18. The function of the push rod 18 in the particular environment shown is to move the member 12, illustrated as the air valve of a power booster, leftwardly as seen in FIG. 1 to actuate the booster. Upon deactuation of the booster, the apply force being exerted on and through the push rod as a compression force to the member 12 is released.

The member 12 may at that time be moved rightwardly as seen in FIG. 1 to move the push rod rightwardly, or at times the push rod may be moved rightwardly so that a tension force is exerted through it to the member 12. In either instance, it is desirable that the push rod ball-and-socket connection remain connected as shown so that there is no excess tolerance creating poor control of the device being controlled or moved by the member 12 while still providing for pivotal movements of the push rod relative to the member 12.

Member 12 has a longitudinal axis 20. When the rod 16 and the insert 14 are installed in member 12 as shown in FIG. 1, the center 22 of the spherical surface 24 of the rod ball end 18 and the longitudinal axis of insert 14 lie on and are coincident with axis 20. Thus, for purposes of description with simplicity, their axes are also identified as axis 20. When the rod 16 is in axial alignment with member 12 and insert 14, its axis is also coincident with axis 20.

Member 12 has an axially extending recess 26 formed therein. Recess 26 has an inner end defined by the recess end wall 28, a substantial portion of which is perpendicular to axis 20. Recess 26 also has an outer end defining an opening 30 and a cylindrical side wall 32 which connects the recess inner and outer ends. The end wall 28 is not entirely flat due to the fact that the member 12 is formed by injection molding with a collapsible mold to form the recess 26. Therefore, there is a slightly raised annular portion 29 which defines the outer periphery of the recess end wall 28. Raised portion 29 is typically axially spaced from the remainder of end wall 28 by approximately 0.4 to 0.6 mm.

An internal annular groove 34 is formed in the recess side wall 32 axially adjacent the recess outer end opening 30. Groove 34 has a first side wall 36 and a second side wall 38 axially spaced from wall 36. These groove side walls are connected by the groove base wall 40. Side wall 36 is axially spaced toward the recess end wall 28 relative to the side wall 38 and defines a first annular frustoconical cam surface, also 36 since they are coextensive. This cam surface 36 has its larger diameter end 44 at the juncture of the side wall 36 and the groove base wall 40. Its smaller diameter end 42 is located at the juncture of the side wall 36 and the recess cylindrical side wall 32. Side wall 38 is substantially perpendicular to the axis 20 so that it forms an annular abutment or shoulder, also 38 since they are coextensive.

A portion of the recess cylindrical side wall 32 located axially between the annular groove 34 and the recess opening 30 is formed to provide a second annular frustoconical cam surface 46. This cam surface has its larger diameter end 50 defining the recess outer end opening 30. Its smaller diameter end 48 is positioned adjacent to but axially spaced from the groove second side wall 36.

The insert 14 is preferably made of a hard but flexible plastic such as nylon. A satisfactory nylon used in successful testing has the following material properties:

| | |
|---|---|
| Young's modulus | 1207 MPa |
| Poisson's Ratio | 0.35 |
| Tensile Yield Strength | 58.6 MPa |
| Specific Gravity | 1.14 |
| Percent Elongation | 25% |

The insert may also be made of other appropriate plastics, such as acetal copolymer with 10 percent weight fiberglass level ($0.6 \times 10^6$ psi flexture modulus), which have sufficient resilience or spring in the insert arms to flex as later described without damage to the insert and which do not spread or extrude excessively under normally expected tension and compression loads plus a safety factor when such loads are placed on it through the push rod.

The insert 14 is arranged to be placed over the rod ball end 18. The insert and the rod ball end are then inserted into the recess opening 30 and moved axially into the recess 26 until they reach the position shown in FIG. 1. At that time, the insert 14 locks the rod ball end in place in the recess 26 with the rod 16 being in pivotal relation to the member 12 and insert 14 about the center 22 of the rod ball end.

Insert 14 has a cylindrical base end 52 which includes a metallic, generally disc-shaped member 102. Disc 102 is stamped to have wall portions 57 and 55, which are substantially parallel to the end walls 28, 29 and effectively mate with the same. Disc 102 has an edge wall 108, which has a two degree taper (converging toward the end wall 28), allowing the polymeric portion of the insert base end 52 to be molded in such a manner that the disc 102 will shape into attachment with the same. Since disc 102 is formed by a stamping operation, a slight depression 104 exists to allow for the protrusion which forms surface 57. The polymeric portion of base end 52 is molded to compensate for the depression 104, forming an opposing wall 106.

The diameter of the peripheral outer surface 58 is such that the insert slides into the recess cylindrical side wall 32 until its base end outer end surfaces 57 and 55 are in surface engagement with the recess end wall 28/29, but there is no noticeable lateral play of the insert in the recess. Thus, this diameter is substantially the same as but no greater than the diameter of the recess cylindrical side wall 32. With the disc 102 juxtaposed between the recess end wall 28/29 and the insert opposing wall 106, there is assured a more even transfer of force from the push rod 16 to the member 12. The above is important since the load placed on the member 12 can approximate 3,200 lbf. The ball has a tendency to concentrate the force input; therefore, the disc 102 is important to spread out the loading on member 12. The distribution of force throughout the member 12 cross-sectional area is even more important in embodiments of air valves (not shown) wherein the diameter of the air valve past end wall 28/29 is drastically reduced.

The base end inner end surface 54 has a spherical segment or part-spherical depression 60 formed in it coaxially on axis 20 of the insert 14. Depression 60 is arranged to be in ball-and-socket surface engagement with a spherical portion of the rod ball end 8 when the mechanism 10 is assembled as shown in FIG. 1.

Insert 14 has a plurality of circumferentially spaced resilient arms 62, 64, 66 and 68 extending in cantilever relation from base end 52. When the insert 14 is made of the nylon plastic noted above, the arms preferably extend slightly outward at an angle A of about 13 degrees to the axis of the insert. Angle A may vary to some extent with this material, usually within a range of about 8 degrees to about 18 degrees. With other materials, angle A may be somewhat different from this range and still be within an acceptable range. Therefore, the value of that outward angle A is determined by the characteristics of the material as used in the particular insert and the angle A of about 13 degrees, with the angle A range of about 8 degrees to about 18 degrees, as stated herein, may be modified within the scope of the invention as disclosed and claimed to take that into account and permit the needed arm movements during installation. The arms must be able to be angularly expanded from their free positions sufficiently to let the rod ball end move into engagement with the depression 60 without damage to the insert. They must then recover toward their free positions and afterward be able to be cammed by cooperating cam surfaces on them and on the cylindrical side wall of recess 26 into their positions which are substantially parallel to the axis of the insert when the insert is in its installed position shown in FIG. 1.

Since all of the insert arms 62, 64, 66 and 68 are identical, only one set of reference characters will be used in describing their details. Each of the insert arms has a radially outwardly extending flange segment or lip 70 defining the free arm end 72 which is opposite the insert base end 52. The flange segment 70 has its side wall 74 on the side thereof toward the insert base end 52 formed to provide a third cam surface, also 74, which is arranged to mate with the cam surface 36 when the insert is installed in recess 26. The other side wall 76 of flange segment 70 is formed to define a shoulder, also 76, which is mateable with the shoulder formed by groove side wall 38.

An arm segment 78 connects the arm flange segment 70 to the base end 52. Arm segment 78 has an inner surface 80 and a cylindrical segment outer surface 82. Surface 82 is mateable with the portion of the recess cylindrical side wall 32 which is axially intermediate recess end wall 28 and internal groove 34. The arm segment 78 has a spherical band segment surface 84 which is adapted for mating surface socket engagement with a portion of the rod spherical ball end 18 so that, when all of the surfaces 84 are so engaged with the rod ball end, the ball end is effectively retained within the insert 14 against substantially all movements relative to the insert other than pivotal movements about the center 22 of the rod ball end. The surfaces 84 are so engaged with the spherical surface 24 rod ball end 18 while the insert and rod are installed in the member 12 as shown in FIG. 1. To assure such retention, each surface 84 has the diameter of its edge 86 that is located axially away from the insert base end 52 of lesser diameter than the diameter of the rod ball end spherical surface 24. In order that the rod 16 may pivot to a reasonable desired extent, the diameter of the arc-forming surface edge 86 is also sufficiently greater than the diameter of that part of rod 16 which is axially beyond the rod ball end spherical surface 24 to permit such pivotal movement of rod 16. The portion of each arm segment inner surface 80 axially adjacent each surface edge 86 is formed to provide a fourth cam surface 88. This cam surface is engaged by the ball end spherical surface 24 of rod 16 when the rod is moved axially into insert 14 so that further axial movement in that direction cams the arms 62, 64, 66 and 68 outwardly as earlier described until the effective opening formed by all of the surface edges 86 is sufficiently large to let the rod ball end pass beyond edges 86 and engage depression 60 and the surfaces 84 to some extent. In the free state, the arms then spring back inwardly so that the surface edges 86 again form an effective opening which is less than the diameter of the ball end spherical surface 24 of rod 16, and the insert 14 is retained on the rod 16.

When the insert 14, with the rod ball end inserted therein and retained thereon, is axially inserted into recess 26 of member 12 through the recess opening 30, the arm segment outer surfaces 82 of the arms 62, 64, 66 and 68 are initially engaged by the cam surface 46. As insertion movement is continued, the arm segments 78 are cammed inwardly to bend said arms 62, 64, 66 and 68 in cantilever fashion at their juncture with the insert base end 52. Continued axial insertion movement of the insert 14 and the rod 16 causes the third cam surface 74 of each flange segment 70 to engage the cam surface 46, forcing the arm flange segments 70 sufficiently inward so that the arm flange segments pass through and beyond the shoulder formed by the groove side wall 38. When the shoulders 76 of arm flange segments 70 clear the shoulder formed by groove side wall 38, the spring action of the cantilever arms moves the flange segments 70 outwardly into the groove 34. The shoulders 76 engage the shoulder formed by the groove side wall 38 in abutting relation, and the third cam surfaces 74 engage the first cam surface 36 in surface-engaging relation. During the camming movements of the arms as above described occurring as the insert 14 and rod 16 are being installed, the spherical band segment surfaces 84 of the arms move to fully engage, and then more tightly engage, the spherical surface 24 of ball end 18 as the arms are moved inwardly. The tighter engagement occurs while the flange segments 70 are being cammed further inward so as to pass over the shoulder formed by side wall 38. When the arm flange segments 70 move slightly back outwardly into the groove 34, the spherical band segment surfaces 84 again fully engage, but do not so tightly engage, the spherical surface of the ball end. The spherical band segment surfaces 84 are not so tightly engaged with the spherical surface of the ball end that the ball end cannot pivot in the socket formed by the depression 60 and the spherical band segment surfaces.

When it is necessary to separate the member 12 and the rod 16, it is sometimes possible to use a small pick-like tool to force the arm outer ends inwardly so that they clear the shoulder formed by the groove side wall 38, at which time the insert 14 may be retracted by tension force exerted on the rod 16. Otherwise, sufficient tension force must be exerted between the push rod 16 and the member 12 to cause the insert to fail and permit removal of the rod. This amount of tension force is well beyond that to which the rod may be normally exposed, even during installation and connection of a pedal to the rod, for example. The insert retains the rod in position in the member 12 under all normal operating conditions.

The embodiments of the invention in which an exclusive property or privilege is claimed are defined as follows:

1. A self-locking ball-and-socket mechanism comprising:
   a polymeric member with a longitudinal axis, said member having a stiffness of a first value, said member having an axially extending recess formed therein, said polymeric member having an end wall with a substantial portion perpendicular to said axis, said polymeric member having a push rod operatively pivotally attached thereto in said recess;
   said push rod having an enlarged ball end operatively secured in said recess to provide said operative pivotal attachment of said push rod to said polymeric member; and
   a polymeric insert, said insert having a stiffness of a second value less than said first value, said insert having a socket formed therein receiving said push rod enlarged ball end therein in pivotal relation and having first means thereon cooperating with said push rod enlarged ball end to receive said ball end in said insert socket in ball-and-socket relation and hold said push rod in said insert so that it is limited to pivotal movement relation only relative to said insert, said insert includes a base end substantially parallel to the end wall, and said insert base end includes a plurality of circumferentially-spaced arms extending axially and radially outward from said base end, said first means being spherical segment surfaces on said base end and the inner surfaces of said arms cooperatively forming a socket for said push rod ball end, said insert and said member further having second means cooperatively acting to cause said insert socket to engage said ball end in such limited pivotal movement relation and said insert to be so locked in said member recess as to retain said insert and said push rod ball end in said member recess with said push rod being in operative pivotal movement relation to said member and being restricted against axial movements in relation to said member, and a metallic member generally disc shaped juxtaposed and abutting between said polymeric member extending recess end wall and said polymeric insert base end for transmittal of force between said push rod and said polymeric member.

2. A self-locking ball-and-socket mechanism comprising:

a polymeric member of a first stiffness, said member having an axially extending recess formed therein, said member having a push rod operatively pivotally attached thereto in said recess;

said push rod having an enlarged ball end operatively secured in said recess to provide said operative pivotal attachment of said push rod to said member;

and an insert with a polymeric portion having a second stiffness less than the first stiffness, the insert having a socket formed therein receiving said push rod enlarged ball end therein in pivotal relation and having first means thereon cooperating with said push rod enlarged ball end to receive said ball end in said insert socket in ball-and-socket relation and hold said push rod in said insert so that it is limited to pivotal movement relation only relative to said insert, said insert includes a base end and a plurality of circumferentially spaced arms extending axially and radially outward from said base end, said first means being spherical segment surfaces on said base end and the inner surfaces of said arms cooperatively forming a socket for said push rod ball end, said insert and said member further having second means cooperatively acting to cause said insert socket to engage said ball end in such limited pivotal movement relation and said insert to be so locked in said member recess as to retain said insert and said push rod ball end in said member recess with said push rod being in operative pivotal movement relation to said member and being restricted against axial movements in relation to said member, and wherein said insert on an end generally opposite said push rod has an attached metallic member to distribute a force input from said push rod to the polymeric member.

3. A ball-and-socket mechanism as described in claim 2 wherein said insert metallic member has a snap-fit attachment with said insert polymeric portion.

4. A vehicle brake booster self-locking ball-and-socket mechanism comprising:

a polymeric air valve of a first stiffness having an axially extending recess formed therein, said air valve having a metallic push rod operatively pivotally attached thereto in said recess;

said push rod having an enlarged ball end operatively secured in said recess to provide said operative pivotal attachment of said push rod to said air valve;

and an insert with a polymeric portion having a second stiffness less than the first stiffness, the insert having a socket formed therein receiving said push rod enlarged ball end therein in pivotal relation and having first means thereon cooperating with said push rod enlarged ball end to receive said ball end in said insert socket in ball-and-socket relation and hold said push rod in said insert so that it is limited to pivotal movement relation only relative to said insert, said insert includes a base end and a plurality of circumferentially spaced arms extending axially and radially outward from said base end, said first means being spherical segment surfaces on said base end and the inner surfaces of said arms cooperatively forming a socket for said push rod ball end, said insert and said air valve further having second means cooperatively acting to cause said insert socket to engage said ball end in such limited pivotal movement relation and said insert to be so locked in said air valve recess as to retain said insert and said push rod ball end in said air valve recess with said push rod being in operative pivotal movement relation to said air valve and being restricted against axial movements in relation to said air valve, and wherein said insert on an end generally opposite said push rod has an attached metallic member to distribute a force input from said push rod to the air valve 5. A booster as described in claim 4 wherein said insert metallic member has a snap fit with said insert polymeric portion.

6. A vehicle brake booster self-locking ball-and-socket mechanism comprising:

a polymeric air valve with a stiffness of a first value, said air valve having a longitudinal axis having an axially extending recess formed therein, said recess having an end wall with a substantial portion perpendicular to said axis, said air valve having a push rod operatively pivotally attached thereto in said recess;

said push rod having an enlarged ball end operatively secured in said recess to provide said operative pivotal attachment of said push rod to said air valve;

an insert with a polymeric portion, said polymeric portion having a stiffness of a second value lower than said first value, said insert also having a socket formed therein receiving said push rod enlarged ball end therein in pivotal relation and having first means thereon cooperating with said push rod enlarged ball end to receive said ball end in said insert socket in ball-and-socket relation and hold said push rod in said insert polymeric portion so that it is limited to pivotal movement relation only relative to said insert, said insert polymeric portion and said air valve further having second means cooperatively acting to cause said insert socket to engage said ball end in such limited pivotal movement relation and said insert being so locked in said air valve recess as to retain said insert and said push rod ball end in said air valve recess with said push rod in operative pivotal movement relation to said air valve, said push rod being restricted against axial movements in relation to said air valve, and wherein said insert polymeric portion includes a base end and a plurality of circumferentially spaced arms extending axially and radially outward from said base end, said first means being spherical segment surfaces on said base end and the inner surfaces of said arms cooperatively forming a socket for said push rod ball end;

and in which said second means includes cam surfaces formed on said insert and said member and a shoulder formed on each of said insert and said member, some of said cam surfaces causing said insert socket to engage said ball end as aforesaid and said shoulders being engaged axially of said member and said insert and with some of said cam surfaces locking said insert in said member recess as aforesaid, and said insert base end having an outer end surface substantially parallel to the end wall; and a metallic member being generally disc-shaped juxtaposed between said air valve end wall and said recess end wall and said insert base outer end surface for transmittal of force from said push rod to said air valve.

* * * * *